United States Patent
Czarnecki et al.

(10) Patent No.: US 6,613,995 B1
(45) Date of Patent: Sep. 2, 2003

(54) SWITCH HAVING STABILIZING PROTRUSIONS TO FACILITATE MOUNTING THEREOF

(75) Inventors: Neil A. Czarnecki, Racine, WI (US); Francis W. Camps, Kewaskum, WI (US); Ray C. Wojtak, Waterford, WI (US)

(73) Assignee: Reliance Controls Corporation, Racine, WI (US)

( * ) Notice: Subject to any disclaimer, the term of this patent is extended or adjusted under 35 U.S.C. 154(b) by 0 days.

(21) Appl. No.: 10/037,387

(22) Filed: Jan. 4, 2002

(51) Int. Cl.⁷ .................................................. H01H 9/00
(52) U.S. Cl. ....................................... 200/296; 200/293
(58) Field of Search ................................. 200/293–297, 200/300–307, 339

(56) References Cited

U.S. PATENT DOCUMENTS

| | | | |
|---|---|---|---|
| 2,779,833 A | 1/1957 | Farison | 200/61.82 |
| 3,487,346 A | 12/1969 | Gardel et al. | 335/205 |
| 4,005,300 A | 1/1977 | Piber | 200/296 |
| 4,080,522 A | 3/1978 | Schimmels | 200/295 |
| 4,123,640 A * | 10/1978 | Ballantyne | 200/296 |
| 4,156,804 A | 5/1979 | Piber | 200/296 |
| 4,252,288 A | 2/1981 | Behrendt | 248/27.1 |
| 4,354,074 A | 10/1982 | Aurand et al. | 200/153 J |
| 4,413,798 A | 11/1983 | Tamura et al. | 248/27.1 |
| 4,434,339 A | 2/1984 | Ohashi | 200/295 |
| 4,939,406 A | 7/1990 | Jeschonneck et al. | 310/154 |
| 5,045,648 A * | 9/1991 | Fogleman, Sr. | 200/43.16 |
| 5,217,190 A * | 6/1993 | Reed et al. | 200/296 |
| 5,343,007 A * | 8/1994 | Roeser et al. | 200/296 |
| 5,438,483 A | 8/1995 | Fasano et al. | 361/825 |
| 5,527,991 A * | 6/1996 | Sadowski et al. | 200/296 |
| 5,834,996 A | 11/1998 | Ullermann | 335/6 |
| 5,881,865 A | 3/1999 | Jang | 200/30.3 |
| 5,924,552 A | 7/1999 | Yu | 200/296 |
| 6,207,910 B1 | 3/2001 | Harvey et al. | 200/51.12 |
| 6,255,612 B1 | 7/2001 | Campana | 200/520 |
| 6,274,831 B1 | 8/2001 | Kim et al. | 200/296 |
| 6,284,991 B1 | 9/2001 | Fasano et al. | 200/296 |
| 6,462,292 B1 * | 10/2002 | Wang | 200/315 |

\* cited by examiner

*Primary Examiner*—Michael Friedhofer
(74) *Attorney, Agent, or Firm*—Andrus, Sceales, Starke & Sawall, LLP

(57) ABSTRACT

A mounting arrangement for a switch having a housing includes a support panel having a wall structure defining an opening therein sized and shaped to receive the housing of the switch. The housing of the switch has a periphery formed with flaring, deformable stabilizing protrusions engageable in a continuous wedging relationship with edges of the opening wall structure to facilitate securement of the switch to the support panel.

13 Claims, 2 Drawing Sheets

SWITCH HAVING STABILIZING PROTRUSIONS TO FACILITATE MOUNTING THEREOF

FIELD OF THE INVENTION

This invention relates broadly to the installation of control elements and, more particularly, pertains to a fastener-free, mounting arrangement for positively securing a switch within the walls forming an opening in a support structure.

BACKGROUND OF THE INVENTION

The prior art is replete with various temporarily deformable lock mechanisms that may be used to fasten a switch to a support panel. Such mechanisms may be attached separately or formed integrally with the body or housing of the switch. Most of the well known locking mechanisms use some form of spring-loaded, snap lock or elastomeric sawtooth member to retain the switch in the panel. In a typical application of these types of temporarily deformable lock mechanisms, the switch is inserted into an opening formed in the panel. The opening is formed slightly larger than the periphery of the switch housing to allow passage of the housing into the opening. A temporarily deformable lock member in its initial configuration contacts one or more walls of the opening during insertion. Inserting the switch into the opening compresses and temporarily alters the configuration of the lock member. The lock mechanism is pushed into the opening until an engaging surface of the mechanism passes through a bottom surface of the panel. Upon passage through the bottom of the panel, the lock mechanism expands or reassumes its initial configuration to seat the switch in the opening of the panel.

Differences in size between the panel opening and the periphery of the switch housing, however, allow gaps to form between walls forming the opening and the switch housing. Unfortunately, such gaps allow the switch sufficient mobility to slide in the panel in longitudinal and transverse directions. This motion is disturbing to the switch operator who is led to believe that such movement suggests a lack of product quality in the switch.

Accordingly, it is desirable to provide a mounting arrangement for positively seating a switch in an opening of a support panel without any axial or lateral movement of the switch relative to the plane of the support panel. It is also desirable to provide a switch with previously unknown stabilizing geometry which will result in a substantially custom fit for the particular opening in which the switch is installed. It is likewise desirable to provide a switch mounting arrangement which improves upon a temporarily deformable lock mechanism.

SUMMARY OF THE INVENTION

It is a general object of the present invention to provide a switch housing structure which permits the tightest possible seating of a switch in an opening formed in a support panel.

It is also an object of the present invention to provide a switch housing structure having flared stabilizing protrusions which are permanently deformed upon contact with the walls of a support panel opening.

It is a further object of the present invention to provide a mounting system for a switch which relies upon a progressive frictional engagement between stabilizing protrusions on the switch housing and the walls of a support panel opening.

It is an additional object of the present invention to provide a switch mounting arrangement which does not require fasteners or tools to perfect a secure installation of a switch relative to a support panel.

It is another object to the present invention to provide a mounting arrangement which may be used on a variety of differently shaped switch housing peripheries to be seated in correspondingly shaped and sized openings in support structure.

In one aspect of the invention, a mounting system is provided for attaching an electrical control element within the walls of an opening formed in a support panel. The invention is improved wherein the electrical control element is provided with permanently deformable structure engageable with the walls of the opening to secure the control element in the support panel without any longitudinal or transverse movement of the control element relative to the walls formed in the opening. The walls of the opening are in progressive frictional engagement with the permanently deformable structure on the electrical control element. The permanently deformable structure is defined by a series of planar stabilizing protrusions which taper outwardly from the control element. The control element is preferably a single pole, double throw paddle switch.

In another aspect of the invention, a mounting arrangement is provided for a switch having a housing. A support panel has a wall structure defining an opening therein sized and shaped to receive the housing of the switch. The housing of the switch has a periphery formed with flaring, deformable stabilizing protrusions engageable in a continuous wedging relationship with edges of the opening wall structure to facilitate securement of the switch to the support panel. The housing of the switch has an upper section removably attached to a lower section. The upper section has a top facing formed with flanges adapted to overlie the edges of the opening wall structure. The upper section provides a pivotal mounting for a switch handle and includes a pair of depending resilient legs having hooked bottoms snap fit into engagement with notches on the lower section. Insertion of the lower section within the opening causes the edges of the opening wall structure to forcibly engage upwardly and outwardly tapered outer surfaces on the stabilizing protrusions extending from the bottom of the upper section to beneath the flanges of the housing. Each of the stabilizing protrusions is formed of a permanently deformable nylon material, and has a crushable zone at one end thereof.

In yet another aspect of the invention, there is provided a method of seating a switch having a housing relative to the walls forming an opening of the support panel. The method includes the steps of forming a periphery of the switch housing with outwardly extending stabilizing protrusions; inserting the switch into the opening formed in the support panel; and engaging the walls of the opening in continuous wedging relationship with the stabilizing protrusions to enable securement of the switch in the support panel.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
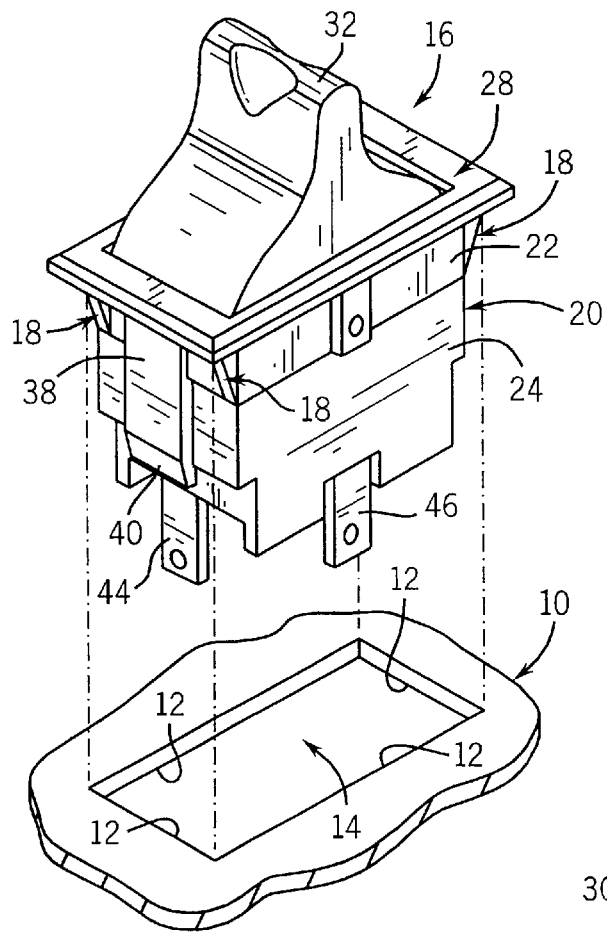
FIG. 1 is a perspective view of a switch adapted to be received in an opening in a support panel, the switch being formed with stabilizing protrusions embodying the present invention.

Referring now to the drawings, FIG. 1 illustrates a planar support panel 10 having adjacent walls 12 forming a rectangular opening 14 for seating an electrical control element in the form of a switch 16 embodying a permanently deformable structure 18 of the present invention. It should be appreciated that the support panel 10 may be cut through completely or partially so as to form opening 14 in a knock out fashion. The phantom lines in FIG. 1 show where the comers of the switch 16 are positioned when the switch 16 is inserted into the opening 14 in support panel 10.

Switch 16 is preferably a single pole, double throw (SPDT) paddle switch having a generally rectangular housing 20 with a periphery which is slightly smaller an the opening 14 formed in support panel 10. In the preferred embodiment, housing 20 has an upper section 22 removably attached to a lower section 24.

Upper section 22 has four vertical comers 26 (best seen in FIG. 3) and a top facing 28 which has flanges 30 extending outwardly therefrom for overlying engagement with the support panel 10 to prevent the switch 16 from sliding through the panel opening 14. The upper section 22 is open along its top to receive a movable switch handle 32 which is pivotally mounted at 34 to opposite sides of the upper section 22. The bottom of the handle 32 includes a pair of cylindrical receivers 34 for holding a pair of spring-biased plungers 36 engageable with movable contact structure in the lower section 24. Opposite ends of the upper section 22 are provided with downwardly depending resilient legs 38 having hooked bottoms 40 adapted to snap into the ends of the lower section 24. The bottom of the upper section 22 has a transverse wall 42 between each leg 38 and the receivers 34 to add reinforcement to the unit.

The lower section 24 of housing 20 has an open top for maintaining a rocking V-shaped contact plate (not shown) which is moved back and forth by a motion of the switch handle 32 to selectively engage sets of fixed contacts (not shown) on the inside bottom surface of the lower section 24. Each of the fixed contacts has a conducting terminal 44 at opposite ends of the lower section 24 and a grounding terminal 46 depends from one side wall of the lower section 24. Opposite ends of the lower section 24 include notches 48 into which the hooked bottoms 40 of upper section legs 38 are retained when the upper section 22 is pushed downwardly into the lower section 24 to complete the switch 16.

In accordance with the present invention, the permanently deformable structure 18 of switch 16 is formed preferably as a set of stabilizing protrusions located along the periphery (in this case, the corners) of the upper section 22 of the housing 20.

Figure 4:
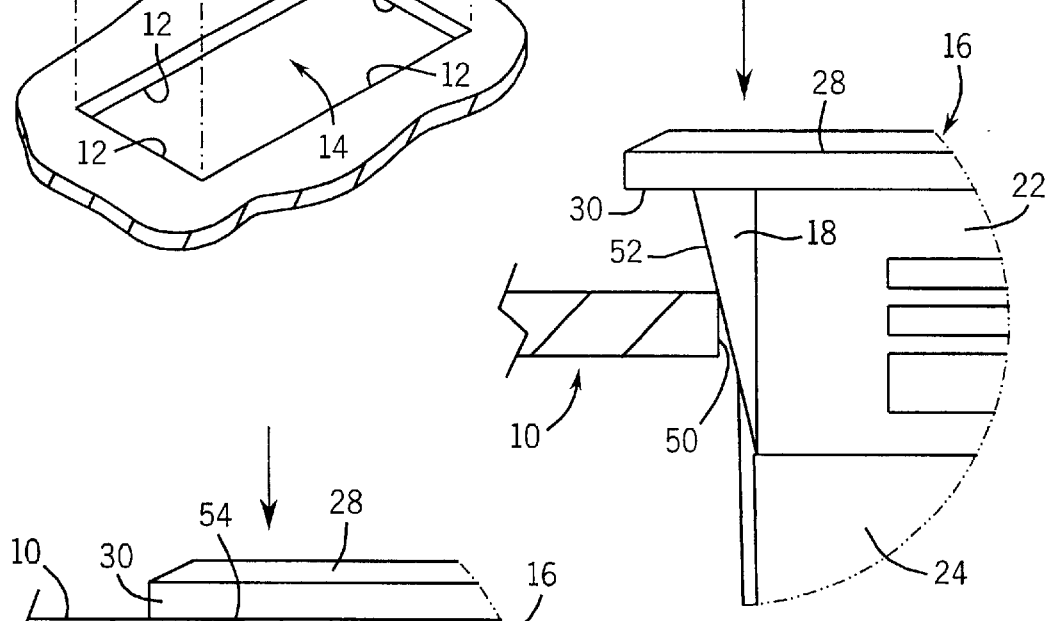
FIG. 4 is a detail view taken on line 4—4 of FIG. 2 showing initial frictional contact between the opening wall edges and the stabilizing protrusions.
Figure 5:
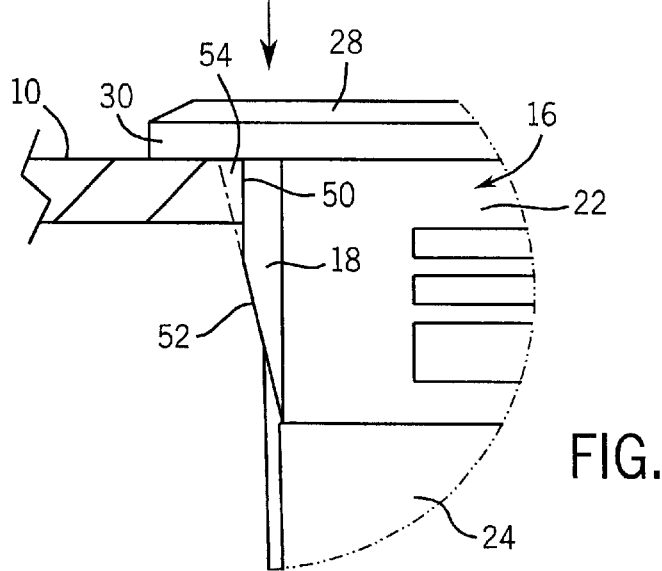
FIG. 5 is a view like FIG. 4 showing finishing frictional contact between opening wall edges and the stabilizing protrusions to positively seat the switch relative to the support panel.
Figure 2:
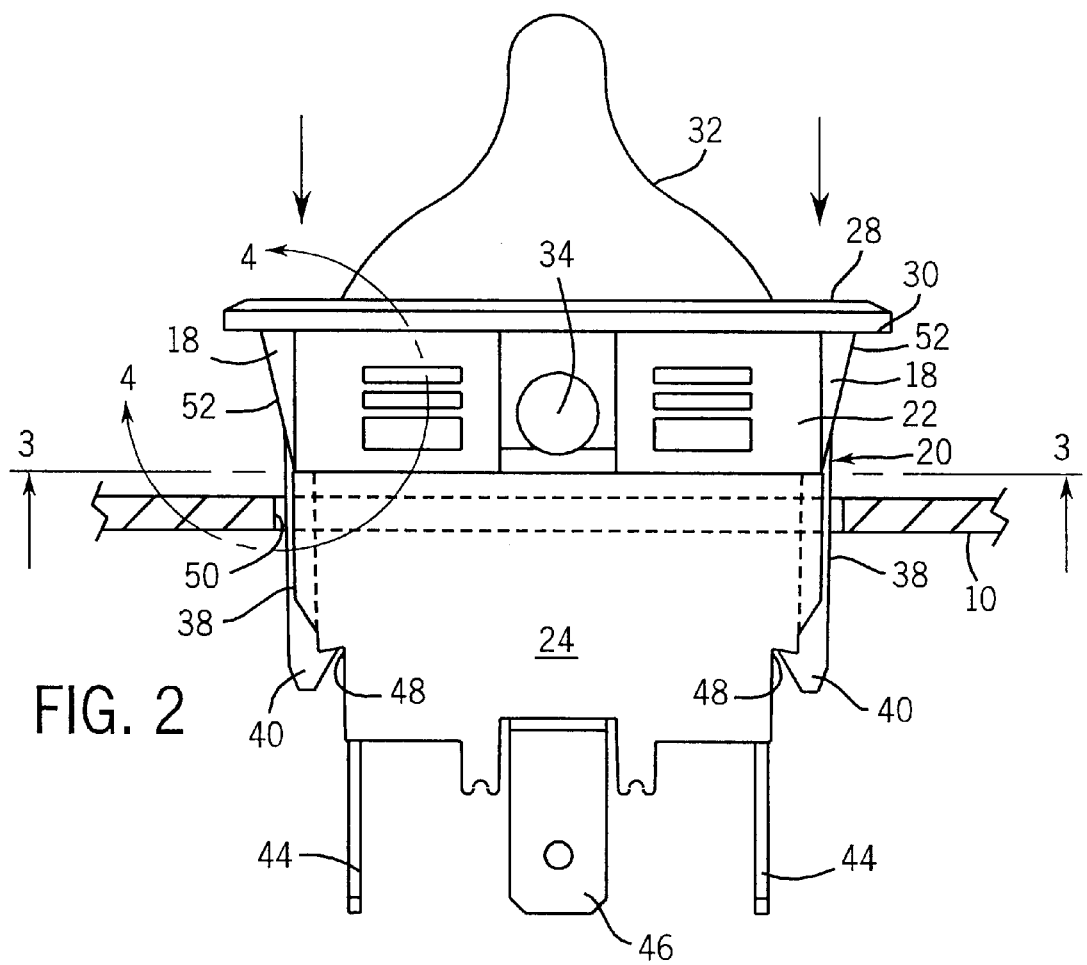
FIG. 2 is a front view of the switch and support panel of FIG. 1 showing an initial downward force being applied to the switch before contact occurs between the stabilizing protrusions and the edges of the walls forming the opening.
Figure 3:
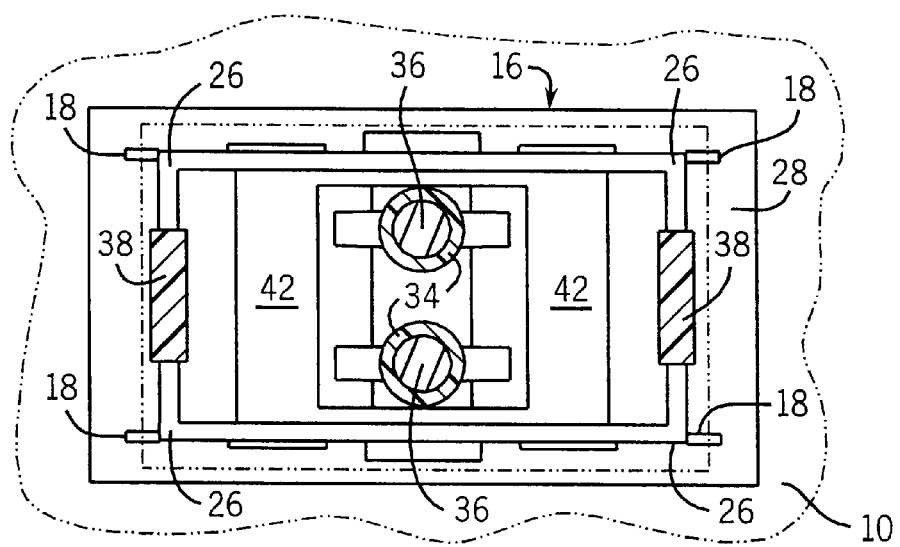
FIG. 3 is a sectional view taken on line 3—3 of FIG. 2.

As best seen in front views of FIGS. 2, 4 and 5, each protrusion 18 tapers outwardly from the bottom of upper section 22 to beneath the flange structure 30 at the top of the upper section 22. From the front, each protrusion 18 is formed as a triangle, the plane of which extends perpendicularly outwardly from the corners of upper section 22 as shown in FIG. 3. Each protrusion 18 is tapered or flared in such a manner as to render the maximum outside dimension of the switch housing 20 smaller at the farthest extremity or insertion position (FIG. 2) and larger at the nearest extremity or seated position (FIG. 5). It is important to note that each protrusion 18 is constructed from a material like nylon which is permanently deformable or crushable when forcefully engaged in a progressive frictional relationship by the walls 12 of the support panel opening 14.

In use, support panel opening 14 is formed only slightly larger than the periphery of switch housing 20. Then, as seen in FIG. 2, the lower end of the switch 16 is inserted into the opening 14 with a downward force (as depicted by the arrows) to seat the switch 16. This downward force eventually causes the edges 50 of the walls 12 forming the support panel opening 14 to act tangentially in a progressive wedging action (FIG. 4) upon the outwardly flaring surface 52 of each stabilizing protrusion 18 from bottom towards the top. Because of the upward flare of the surface 52, the edges 50 of the walls 12 act with sufficient force to permanently deform or crush the upper end or zone 54 (FIG. 5) of each protrusion 18 so that each edge 50 is wedged between the underside of facing 28 and the upper end of each protrusion 18 (FIG. 5). As a result, the triangular shape of each protrusion 18 assumes a substantially trapezoidal shape. The effect of such permanent deformation is that the switch housing 20 is tightly secured in the support panel 10 without any longitudinal or transverse motion of the switch 16 relative to the plane of the support panel 10. The mounting arrangement of the present invention thus provides a substantially custom fit for the particular opening 14 into which the switch 16 is installed.

While the preferred embodiment discloses a switch housing 20 and support panel opening 14 having a generally rectangular configuration, it should be appreciated that the stabilizing protrusions 18 may be used on a periphery of round or other polygonal rocker, toggle, rotary wheel or push button switches inserted into correspondingly sized and shaped openings. Likewise, it should be understood that a switch 16 could be mounted upside down from support panel 10 in which case the stabilizing protrusions 18 would be flared or tapered opposite from those disclosed herein. The present invention also contemplates that the outward surface 52 of each protrusion 18 may have an alternative contour such as an undulating surface which provides the same permanent deformation at the top end thereof.

The mounting system of the present invention is economical to manufacture, easy to use and overcomes many of the seating problems experienced with prior art temporarily deformable locking mechanisms. No additional fasteners or special tools are required in mounting the switch within the support panel.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. In a mounting system for attaching an electrical control element within a set of walls of an opening formed in a support panel, the improvement wherein:

the electrical control element is provided with permanently deformable structure engageable with the walls of the opening to secure the control element in the support panel without any longitudinal or transverse movement of the control element relative to the walls forming the opening.

2. The improvement of claim 1, wherein the walls of the opening are in progressive frictional engagement with the permanently deformable structure on the electrical control element.

3. The improvement of claim 1, wherein the permanently deformable structure is defined by a series of planar stabilizing protrusions which taper outwardly from the control element.

4. The improvement of claim 1, wherein the control element is a single pole, double throw paddle switch.

5. A mounting arrangement for a switch having a housing comprising:

a support panel having wall structure with edges defining an opening therein sized and shaped to receive the housing of the switch; and the housing of the switch having a periphery formed with flaring, permanently deformable stabilizing protrusions engageable in continuous wedging relationship with the edges of the opening wall structure to facilitate securement of the switch housing to the support panel without any longitudinal or transverse movement of the switch housing relative to the wall structure defining the opening.

6. The mounting arrangement of claim 5, wherein the housing of the switch has an upper section removably attached to a lower section.

7. The mounting arrangement of claim 6, wherein the wherein the upper section has a top facing formed with flanges overlying the edges of the opening wall structure.

8. The mounting arrangement of claim 7, wherein insertion of the lower section within the opening causes the edges of the opening wall structure to forcefully engage upwardly and outwardly tapered outer surfaces on the stabilizing protrusions extending from a bottom of the upper section to beneath the flanges on the facing.

9. The mounting arrangement of claim 6, wherein the upper section provides a pivotal mounting for a switch handle and includes a pair of depending resilient legs having hooked bottoms snap fit into engagement with notches on the lower section.

10. The mounting arrangement of claim 5, wherein each of the stabilizing protrusions is formed of a permanently deformable nylon material.

11. The mounting arrangement of claim 10, wherein each of the stabilizing protrusions has a crushable zone at one end thereof.

12. A method of seating a switch having a housing relative to a set of walls forming an opening of a support panel, the method comprising the steps of:

forming a periphery of the switch housing with outwardly extending, permanently deformable stabilizing protrusions;

inserting the switch housing into the opening formed in the support panel; and engaging the walls of the opening in continuous wedging relationship with the stabilizing protrusions to enable securement of the switch housing in the support panel without any longitudinal or transverse movement of the switch housing relative to the walls forming the opening.

13. A mounting arrangement for a switch having a housing comprising:

a support panel having wall structure with edges defining an opening therein sized and shaped to receive the housing of the switch; and the housing of the switch having a periphery formed with flaring, deformable stabilizing protrusions engageable in continuous wedging relationship with the edges of the opening wall structure to facilitate securement of the switch to the support panel, wherein each of the stabilizing protrusions has a crushable zone at one end thereof.

* * * * *